US008862250B2

(12) United States Patent
Ko et al.

(10) Patent No.: US 8,862,250 B2
(45) Date of Patent: Oct. 14, 2014

(54) INTEGRATED EXPERT SYSTEM FOR IDENTIFYING ABNORMAL EVENTS IN AN INDUSTRIAL PLANT

(75) Inventors: Byung-Su Ko, Fairfax, VA (US); Ramesh Vaidhyanathan, Vienna, VA (US); Jeffrey Richter, Chantilly, VA (US); Thomas F. O'Connor, Washington, DC (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 221 days.

(21) Appl. No.: 13/101,497

(22) Filed: May 5, 2011

(65) Prior Publication Data
US 2011/0276165 A1 Nov. 10, 2011

Related U.S. Application Data

(60) Provisional application No. 61/332,392, filed on May 7, 2010.

(51) Int. Cl.
| | |
|---|---|
| *G05B 9/02* | (2006.01) |
| *G06F 11/30* | (2006.01) |
| *G06F 17/00* | (2006.01) |
| *G06N 5/04* | (2006.01) |
| *G05B 23/02* | (2006.01) |

(52) U.S. Cl.
CPC .............. *G05B 23/0245* (2013.01); *G06N 5/04* (2013.01)
USPC ................... 700/80; 700/29; 700/49; 700/51; 702/183; 706/60

(58) Field of Classification Search
USPC ............................................ 700/29; 702/22
See application file for complete search history.

(56) References Cited

U.S. PATENT DOCUMENTS

| | | | |
|---|---|---|---|
| 3,175,968 A | 3/1965 | Berger | |
| 4,060,716 A | 11/1977 | Pekrul et al. | |

(Continued)

FOREIGN PATENT DOCUMENTS

| | | |
|---|---|---|
| EP | 0428135 | 11/1990 |
| EP | 0626697 | 5/1994 |

(Continued)

OTHER PUBLICATIONS

Venkat Venkatasubramanian, Raghunathan Rengaswamy, Surya N. Kavuri, Kewen Yin; "A review of process fault detection and diagnosis Party III: Process history based methods," Computers and Chemical Engineering 27 (203) 327-346.

(Continued)

*Primary Examiner* — Sean Shechtman
(74) *Attorney, Agent, or Firm* — Glenn T. Barrett; Malcolm D. Keen

(57) ABSTRACT

A computer-implemented integrated expert system for the identification of abnormal events in an industrial plant. The expert system integrates a model-based expert system with a rule-based expert system. The model-based expert system receives data on the operating conditions of a process unit in the industrial plant and calculates one or more results that determine whether the process unit is operating abnormally. The rule-based expert system also receives data on the operating conditions of the process unit and applies its rules to the process data. The rule-based expert system also applies its rules to the one or more results generated by the model-based expert system. The integrated system may also suppress any redundant messages generated by the model-based expert system.

25 Claims, 6 Drawing Sheets

(56) References Cited

U.S. PATENT DOCUMENTS

| | | | |
|---|---|---|---|
| 4,549,934 A | 10/1985 | Graf et al. | |
| 4,764,318 A | 8/1988 | Morgenstern et al. | |
| 5,023,045 A * | 6/1991 | Watanabe et al. | 376/215 |
| 5,333,240 A | 7/1994 | Matsumoto et al. | |
| 5,351,247 A | 9/1994 | Dow et al. | |
| 5,457,625 A | 10/1995 | Lim et al. | |
| 5,465,321 A | 11/1995 | Smyth | |
| 5,539,877 A | 7/1996 | Winokur et al. | |
| 5,817,958 A | 10/1998 | Uchida et al. | |
| 5,841,659 A * | 11/1998 | Tanaka et al. | 700/121 |
| 5,859,964 A | 1/1999 | Wang et al. | |
| 5,949,677 A | 9/1999 | Ho | |
| 5,950,147 A | 9/1999 | Sarangapani et al. | |
| 6,115,656 A | 9/2000 | Sudolsky | |
| 6,133,132 A | 10/2000 | Toprac et al. | |
| 6,207,043 B1 | 3/2001 | Vicari et al. | |
| 6,368,975 B1 | 4/2002 | Balasubramhanya et al. | |
| 6,466,877 B1 | 10/2002 | Chen et al. | |
| 6,485,631 B1 | 11/2002 | Ellingsen | |
| 6,505,145 B1 | 1/2003 | Bjornson | |
| 6,513,129 B1 * | 1/2003 | Tentij et al. | 714/4.12 |
| 6,521,080 B2 | 2/2003 | Balasubramhanya et al. | |
| 6,522,978 B1 | 2/2003 | Chen et al. | |
| 6,564,119 B1 | 5/2003 | Vaculik et al. | |
| 6,606,580 B1 | 8/2003 | Zedda et al. | |
| 6,625,569 B2 | 9/2003 | James et al. | |
| 6,636,842 B1 | 10/2003 | Zambrano et al. | |
| 6,681,344 B1 | 1/2004 | Andrew | |
| 6,701,285 B2 | 3/2004 | Salonen | |
| 6,735,541 B2 | 5/2004 | Kern et al. | |
| 6,760,639 B2 | 7/2004 | Kallela et al. | |
| 6,809,837 B1 | 10/2004 | Mestha et al. | |
| 6,813,532 B2 | 11/2004 | Eryurek et al. | |
| 6,904,328 B2 | 6/2005 | Rietman et al. | |
| 6,904,386 B2 | 6/2005 | Mylaraswamy | |
| 6,907,383 B2 | 6/2005 | Eryurek et al. | |
| 6,917,839 B2 | 7/2005 | Bickford | |
| 6,925,338 B2 | 8/2005 | Eryurek et al. | |
| 6,934,663 B2 | 8/2005 | Bjornson | |
| 6,954,713 B2 | 10/2005 | Eryurek | |
| 6,973,396 B1 | 12/2005 | Shah et al. | |
| 6,978,210 B1 | 12/2005 | Suter et al. | |
| 6,980,938 B2 | 12/2005 | Cutler | |
| 6,993,407 B2 | 1/2006 | Sun | |
| 7,079,984 B2 | 7/2006 | Eryurek et al. | |
| 7,085,610 B2 | 8/2006 | Eryurek et al. | |
| 7,088,255 B2 | 8/2006 | Ridolfo et al. | |
| 7,096,074 B2 | 8/2006 | Yulevitch et al. | |
| 7,096,153 B2 | 8/2006 | Guralnik et al. | |
| 7,181,654 B2 | 2/2007 | Ford, Jr. et al. | |
| 7,243,048 B2 | 7/2007 | Foslien et al. | |
| 7,308,331 B2 | 12/2007 | Bjornson | |
| 7,349,746 B2 | 3/2008 | Emigholz et al. | |
| 7,424,395 B2 | 9/2008 | Emigholz et al. | |
| 7,526,405 B2 | 4/2009 | Miller | |
| 7,533,070 B2 | 5/2009 | Guralnik et al. | |
| 7,539,974 B2 * | 5/2009 | Beck et al. | 717/117 |
| 7,567,887 B2 | 7/2009 | Emigholz et al. | |
| 7,647,126 B2 | 1/2010 | Blevins et al. | |
| 2002/0077792 A1 | 6/2002 | Qiu | |
| 2003/0083756 A1 | 5/2003 | Hsiung et al. | |
| 2004/0002776 A1 | 1/2004 | Bickford | |
| 2004/0033617 A1 | 2/2004 | Sonbul | |
| 2004/0078171 A1 | 4/2004 | Wegerich et al. | |
| 2004/0078683 A1 | 4/2004 | Buia et al. | |
| 2004/0172229 A1 | 9/2004 | Aragones et al. | |
| 2005/0067816 A1 | 3/2005 | Buckman | |
| 2005/0114494 A1 | 5/2005 | Beck et al. | |
| 2005/0137832 A1 * | 6/2005 | Yemini et al. | 702/183 |
| 2005/0141782 A1 | 6/2005 | Guralniki et al. | |
| 2005/0149297 A1 | 7/2005 | Guralnik et al. | |
| 2005/0197805 A1 | 9/2005 | Eryurek et al. | |
| 2005/0267702 A1 | 12/2005 | Shah et al. | |
| 2005/0267710 A1 | 12/2005 | Heavner, III et al. | |
| 2006/0020423 A1 | 1/2006 | Sharpe, Jr. | |
| 2006/0036403 A1 | 2/2006 | Wegerich et al. | |
| 2006/0058898 A1 | 3/2006 | Emigholz et al. | |
| 2006/0064291 A1 * | 3/2006 | Pattipatti et al. | 703/14 |
| 2006/0073013 A1 | 4/2006 | Emigholz et al. | |
| 2006/0074598 A1 | 4/2006 | Emigholz et al. | |
| 2006/0074599 A1 | 4/2006 | Emigholz et al. | |
| 2007/0005266 A1 * | 1/2007 | Blevins et al. | 702/22 |
| 2007/0083846 A1 * | 4/2007 | Chuang et al. | 716/19 |
| 2007/0088448 A1 | 4/2007 | Mylaraswamy et al. | |
| 2007/0088528 A1 | 4/2007 | Miller | |
| 2007/0088534 A1 | 4/2007 | MacArthur et al. | |
| 2007/0124113 A1 | 5/2007 | Foslien et al. | |
| 2007/0174225 A1 | 7/2007 | Blevins et al. | |
| 2007/0233428 A1 | 10/2007 | Emigholz et al. | |
| 2007/0250292 A1 | 10/2007 | Alagappan et al. | |
| 2008/0004840 A1 | 1/2008 | Pattipatti et al. | |
| 2008/0082302 A1 | 4/2008 | Samardzija et al. | |
| 2008/0097637 A1 | 4/2008 | Nguyen et al. | |
| 2008/0154832 A1 * | 6/2008 | Kral et al. | 706/47 |
| 2008/0262875 A1 * | 10/2008 | Plavnik et al. | 705/3 |
| 2008/0281557 A1 | 11/2008 | Emigholz | |
| 2009/0149981 A1 | 6/2009 | Evans et al. | |
| 2009/0300417 A1 | 12/2009 | Bonissone et al. | |
| 2009/0319464 A1 * | 12/2009 | Kral et al. | 706/47 |

FOREIGN PATENT DOCUMENTS

| | | |
|---|---|---|
| JP | 6460110 | 3/1989 |
| JP | 6331507 | 12/1994 |
| JP | 10143343 | 5/1998 |
| WO | 2005106671 | 11/2005 |
| WO | 2008017098 | 4/2008 |

OTHER PUBLICATIONS

T. S. Ramesh, B. V. Kral; "Plant Monitor: An On-Line Advisory System for Monitoring Polyethylene Plants;" ISPE Proceedings, Industrial Applications Sessions, pp. 1-6.

M. B. Bell, W. K. Foslien; "Early Event Detection—Results from a Prototype Implementaiton," Paper TA006f prepared for presentation at the 2005 Spring National Meeting, Atlanta, GA, Apr. 10-14, 2005, 17th Annual Ethylene Producers' Conference.

M. Bell, J. Errington, D. V. Reising, D. Mylaraswamy; "Early Event Detection—A Prototype Implementation," Ethylene 3 EED Prototype Project by ASM Consortium.

T.S. Ramesh, B. V. Kral, J. A. Freeman; "A Generic Real-Time Monitor for Detecting Abnormal Eventgs in Continuous Processes," presented at the AIChE Process Safety Symposium, Houston, TX, Apr. 1996, pp. 1-10.

D. Mylaraswamy, P. Bullemer, K. Emigholz; "Fielding a Multiple State Estimator Platform," submitted to NPRA Computer Conference, Chicago, IL, Nov. 2000, pp. 1-10.

J. Workman, Jr., D. J. Veltkamp, S. Doherty, B.B. Anderson, K.E. Creasy, M. Koch, J. F. Tatera, A. L. Robinson, L. Bond, L. W. Burgess, G. N. Bokerman, A. H. Ullman, G. P. Darsey, F. Mozayeni, J. A. Amberger, M. S. Greenwood; "Process Analytical Chemistry," Anal. Chem. 1999, 71, pp. 121R-180R.

* cited by examiner

T-814 MODEL PCA Model Configuration

| General | Details | Inputs | Related Tags | Logging | Suppression | Internal Suppression | Model Tuning | Reports |
|---|---|---|---|---|---|---|---|---|
| Source | Tag Name | Model Attribute | Critical | Filter Ti... | Limit Check | Lower L... | Upper Limit | Standard Deviation | Description |
| Tag | R1I485.PV | | | 3.0 | None | | | .79304 | Temperature Variable8 |
| Tag | R1I486.PV | | | 3.0 | None | | | .7594 | Temperature Variable7 |
| Tag | R1I487.PV | | | 3.0 | None | | | .76374 | Temperature Variable6 |
| Tag | R1I488.PV | | | 3.0 | None | | | .76558 | Temperature Variable5 |
| Tag | R1I489.PV | | | 3.0 | None | | | .7666 | Temperature Variable4 |
| Tag | R1I490.PV | | | 3.0 | None | | | .56039 | Temperature Variable3 |
| Tag | R1I491.PV | | | 3.0 | None | | | .67816 | Temperature Variable2 |
| Tag | R1P752.PV | | | 3.0 | None | | | .14458 | Pressure Variable4 |
| Tag | R1P770.PV | | | 3.0 | None | | | .14138 | Pressure Variable3 |
| Tag | R1P871.PV | | | 3.0 | None | | | .14131 | Pressure Variable2 |
| Tag | R1P873.PV | | | 3.0 | None | | | .14279 | Pressure Variable1 |
| Tag | R1T772.PV | | ✓ | 3.0 | None | | | .5394 | Temperature Variable1 |
| Tag | R1F782U.PV | | | 3.0 | None | | | .44689 | Flow Variable1 |

FIGURE 2

Rule T-814 Flooding Configuration

| General | Details | *Rule Logic* | Conclusion | Logging | Suppression | Comments | Reports |
|---|---|---|---|---|---|---|---|

Generic Formula: c1 and c2     Status: FALSE

| | Type | Condition | Timer Operation | Duration | Status | Suppress? |
|---|---|---|---|---|---|---|
| C1 | Expr | R1F782.PV > 275 | | 0.0 | False | |
| C2 | Expr | PCA-RESIDUAL ('T-814', R1P770.PV) >6 | | 0.0 | False | |

Dependent Rules

FIGURE 3A

Rule T-814 Flooding Configuration

| General | Details | Rule Logic | *Conclusion* | Logging | Suppression | Comments | Reports |
|---|---|---|---|---|---|---|---|
| Conclusion Name | | | T-814 Flooding Conclusion | | | | |
| Trl | | | -1 | | | | |
| Status | | | TRUE | | | | |
| Hits | | | 2 | | | | |
| Category | | | Status | | | | |
| Message | | | Flooding in tower T-814 is identified. Monitor the DP and make the following adjustments.<br>1) reduce the tower inlet flow rate<br>2) reduce the reboiler duty<br>3) reduce the reflux ratio | | | | |
| Documentation | | | | | | | |
| Other Rules Leading to this Conclusion | | | | | | | |

FIGURE 3B

INTEGRATED EXPERT SYSTEM FOR IDENTIFYING ABNORMAL EVENTS IN AN INDUSTRIAL PLANT

This application claims the benefit of U.S. Provisional Applications No. 61/332,392 (filed on May 7, 2010), which is incorporated by reference herein in its entirety.

TECHNICAL FIELD

The present invention relates to computer-implemented expert systems for identifying abnormal events in an industrial plant, such as a refinery or a petrochemical plant.

BACKGROUND

Modern petroleum refineries are controlled by advanced process control systems. These process control systems can perform a number of functions, including optimizing the process and identifying abnormal events in the operation of the plant.

Events and disturbances of various magnitudes are constantly affecting process operations. Most of the time, these events and disturbances are handled by the process control system. However, a human operator will sometimes need to intervene in the process operations when the process control system cannot adequately handle an abnormal event. Human intervention is initiated by notifying the console operator of the abnormal situation through alert messages. Alert messages are triggered when certain process measurements violate predefined operating ranges and/or correlations. Early identification of these abnormal events enables the operations team to intervene before the problem escalates into a more severe incident.

In many cases, the identification of abnormal events is performed by expert systems. Expert systems are computerized tools designed to assist the plant operators in making decisions about how to operate the industrial plant. Two commonly used types of expert systems are model-based expert systems and rule-based expert systems.

SUMMARY

Certain embodiments of the present invention relates to the use of both a model-based expert system and a rule-based expert system for the identification of abnormal events in an industrial plant. An underlying abnormality in the plant operations may generate a large number of alert messages, many of which may be superfluous or redundant. An overload of alert messages can reduce the effectiveness of the abnormal event identification system. This problem of message overload can be compounded when using both a model-based expert system together with a rule-based expert system for diagnosis. Thus, the integrated system is designed to reduce the generation of nuisance or redundant alerts by better coordination of messages to the plant operator. The integrated system may also be designed to cope with different operating modes of the plant.

In one embodiment, the present invention provides a method for identifying an abnormal event in the operation of an industrial plant. The method comprises having: (i) a rule-based expert system that comprises a set of rules for evaluating the operation of a process unit in the industrial plant, and (ii) a model-based expert system that comprises a mathematical model for evaluating the operation of the process unit in the industrial plant. The model-based expert system evaluates the operation of the process unit using data on the operating conditions of the process unit. The model-based expert system calculates one or more results that determines whether the process unit is operating abnormally. The rule-based expert system is applied to identify a possible abnormality in the operation of the process unit using: (a) data on the operating conditions of the process unit, and (b) one or more of the results from the model-based expert system. If an abnormal event is identified, a message is sent to an operator regarding the abnormality. Furthermore, any redundant messages from the model-based expert system may be suppressed. Certain embodiments of the present invention also provide a computer system that is programmed to perform the method, and also, an industrial plant that includes such a computer system.

In a preferred embodiment herein is a method for operating an industrial plant, comprising:
  having a rule-based expert system that comprises a set of rules for evaluating the operation of a process unit in the industrial plant;
  having a model-based expert system that comprises a mathematical model for evaluating the operation of the process unit in the industrial plant;
  applying the model-based expert system to evaluate the operation of the process unit using data on the operating conditions of the process unit;
  obtaining a result from the model-based expert system;
  applying the rule-based expert system to identify a possible abnormality in the operation of the process unit using: (a) data on the operating conditions of the process unit, and (b) the result from the model-based expert system;
  sending a message regarding an abnormality to an operator interface;
  suppressing a message from the model-based expert system, wherein the suppressed message relates to the abnormality; and
  adjusting the operation of the process unit based on the message relating to the abnormality.

In another preferred embodiment herein is an industrial plant, comprising:
  a process unit;
  multiple sensors that sense the operating condition of the process unit;
  a process control system in communication with the multiple sensors;
  an operator interface; and
  a computer system that comprises:
  a) a rule-based expert system that comprises a set of rules for evaluating the operation of the process unit;
  b) a model-based expert system that comprises a mathematical model for evaluating the operation of the process unit;
  wherein the computer system is programmed to perform steps comprising:
  receiving data on the operating conditions of the process unit;
  applying the model-based expert system to evaluate the operation of the process unit using data on the operating conditions of the process unit;
  obtaining a result from the model-based expert system;
  applying the rule-based expert system to identify a possible abnormality in the operation of the process unit using: (a) data on the operating conditions of the process unit, and (b) the result from the model-based expert system;
  sending a message regarding an abnormality to the operator interface; and
  suppressing a message from the model-based expert system, wherein the suppressed message relates to the abnormality.

In yet another preferred embodiment herein is a computer system comprising:

a) a rule-based expert system that comprises a set of rules for evaluating the operation of a process unit in an industrial plant;

b) a model-based expert system that comprises a mathematical model for evaluating the operation of the process unit;

wherein the computer system is programmed to perform steps comprising:

receiving data on the operating conditions of the process unit;

applying the model-based expert system to evaluate the operation of the process unit using data on the operating conditions of the process unit;

obtaining a result from the model-based expert system;

applying the rule-based expert system to identify a possible abnormality in the operation of the process unit using: (a) data on the operating conditions of the process unit, and (b) the result from the model-based expert system;

sending a message regarding an abnormality to an operator interface; and suppressing a message from the model-based expert system, wherein the suppressed message relates to the abnormality.

BRIEF DESCRIPTION OF THE DRAWINGS

FIG. 2 is a screenshot view showing example inputs for a principal component analysis (PCA) model for a distillation tower.

FIGS. 3A and 3B are screenshot views demonstrating the operation of a rule-based expert system designed for monitoring a distillation tower.

DETAILED DESCRIPTION

Figure 1:
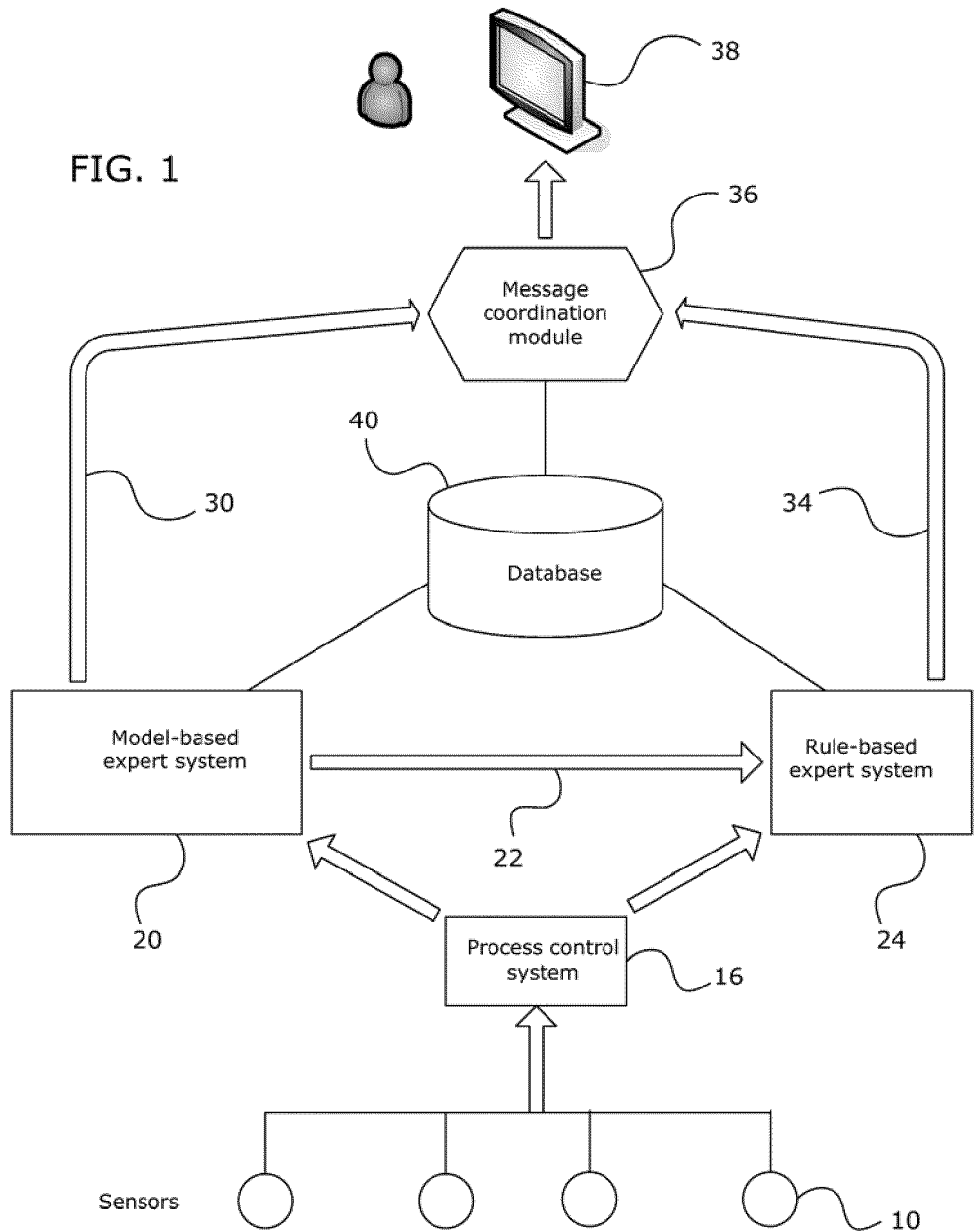
FIG. 1 shows a schematic diagram of how the present invention can be implemented according to one particular embodiment.

Certain embodiments of the present invention relates to expert systems for identifying abnormal events in the operation of an industrial plant. In these embodiments, a model-based expert system is integrated with a rule-based expert system for improving the effectiveness of the system in identifying abnormal events.

A model-based expert system is an expert system that uses a mathematical model of an industrial process based on empirical knowledge or a fundamental understanding of statistical or engineering principles underlying the process. The model-based expert system used in the present invention may be constructed in any suitable manner. The mathematical models are designed to represent the normal operation of the industrial process. A wide variety of different mathematical models that represent various industrial processes are known in the art. Examples of such mathematical models include simple engineering equations that express the relationships between process variables during normal operations, principal component analysis (PCA) models which decompose the plant operation data into principal components, and multivariate statistical models based on variations of PCA models. For example, principal component analysis (PCA) models for various process units in a petroleum refinery are described in U.S. Patent Application Publication No. 2007/0250292 (titled "Application of Abnormal Event Detection Technology to Delayed Coking Unit," by Alagappan et al.) and U.S. Pat. No. 7,349,746 (titled "System and Method for Abnormal Event Detection in the Operation of Continuous Industrial Processes," by Emigholz et al.), which are both incorporated by reference in their entirety.

Process data is fed into the model-based expert system and is used to populate variables in the mathematical model. The process data may be received in real time (e.g., from a data historian or from a process control system in the industrial plant). Based on these inputs, the mathematical model will calculate the values of other variables that represent the normal operation of the particular process unit. The calculated values are compared against the actual values of the process conditions represented by the model variables. For example, the model-based expert system may calculate a statistical analysis result (e.g., the sum of square prediction errors) to assess how much the actual process values deviate from the model-calculated values. The statistical analysis result may indicate that the process unit is operating abnormally. For example, the models described in U.S. Patent Application Publication No. 2007/0250292 (Alagappan et al., which is incorporated by reference herein) are used to generate a single abnormality probability. The model-based expert system may send an alert message to a plant operator if the results from the model violate predefined threshold limits.

The mathematical model may be constructed to represent any of various process units that operate in an industrial plant. The process units within the industrial plant may be defined in any suitable way. For example, process units may be defined according to equipment or groups of equipment, subcomponents of the equipment, or processes within the same control loop of the process control system in the industrial plant. For example, in a refinery or petrochemical plant, a process unit may be a catalytic cracker, distillation tower, a reactor, a heat exchange train, or subcomponents thereof.

In the case of a PCA model, conceptual model design can be broken into four major decisions: (1) subdividing the process equipment into equipment groups with corresponding PCA models; (2) subdividing process operating data and time periods into process operating modes requiring different PCA models; (3) identifying which measurements within an equipment group should be designated as inputs to each PCA model; and (4) identifying which measurements or variables within an equipment group should act as flags for suppressing known events or other exception operations. Defining groups of equipment that will be covered by a single PCA model requires an understanding of the process integration/interaction. For example, equipment groups can be defined by including all the major material and energy integrations, and quick recycles in the same equipment group (which may also be referred to as key functional sections or operational sections of the industrial plant). Furthermore, analysis of the process control applications may indicate the major interactions among the process units. For example, if the process uses a multivariable constraint controller, the controller model may explicitly identify the interaction points among the process units. Otherwise, the interactions may need to be identified through an engineering analysis of the process.

In some cases, process units can be divided at a point where there is minimal interaction between equipment groups. For example, a dividing point can be made where the only interaction comes through a single pipe containing the feed to the next downstream unit. In this case, the temperature, pressure, flow, and composition of the feed are the primary influences on the downstream equipment group and the pressure in the immediate downstream unit is the primary influence on the upstream equipment group. Similar to the design of a multi-variable constraint controller, the boundary of the PCA model may encompass all significant process interactions and key upstream and downstream indications of process changes and disturbances. Thus, one model may cover the upstream equipment group and another model may cover the downstream equipment group, but these primary influence measurements may be included in both models. Process units may also be divided into equipment groups wherever there are significant time dynamics (e.g., storage tanks, long pipelines, etc.).

In certain embodiments, the model-based expert system comprises multiple different mathematical models for the same process unit in the industrial plant. For example, the different mathematical models may be adapted for use in different operating modes of the process unit. For example, a process unit in an industrial plant may use different operating modes for different grades of product, significant process transitions (e.g., startups, shutdowns, feedstock switches), processing of different feedstock (e.g., cracking naphtha rather than ethane in olefins production), different configurations of the process equipment (e.g., different sets of equipment running), different time periods (e.g., summer vs. winter), different control modes of operation (e.g., automatic, manual, or cascade), or different production rates (e.g., high throughput vs. low throughput). Where these different operating modes exist, different mathematical models may be needed.

In certain embodiments of the present invention, the model-based expert system is integrated with a rule-based expert system. A rule-based expert system is an expert system that is based on a set of rules for evaluating a problem, similar to those a human expert would follow in identifying the problem. The rules are designed to capture available knowledge regarding the process in question. The rules are in the form of "condition-action" rules, also known as "if-then" rules. The "if" portion specifies a fact or particular set of facts that cause the rule to be applicable. The "then" portion of the rule specifies the action to be taken if the "if" condition is satisfied. The condition part of each rule can contain relations that are applied to the process data that is fed into the rule-based expert system. The conditions can be expressed by arithmetic relations such as greater than ($>$), less than ($<$), equal to ($=$), greater than or equal to ($\geq$), less than or equal to ($\leq$), and not equal to ($/=$). Calculation functions, such as rate of change, % change, historical statistics, etc., can also be used in the conditions.

The rule-based expert system receives data on the operating conditions of the process unit. For example, the rule-based expert system can monitor various process conditions, such as temperatures, flow rates, concentrations, valve positions, tank levels, control signal values, alarms, production rate, or other measurements. By applying the rules to the data on the operating conditions of the process unit, the rule-based expert system can draw conclusions about the state of the industrial process. Additionally, the rule-based expert system may analyze historical data associated with the process unit, such as past alerts, operator actions, set point changes, operating modes, historic values of process variables or parameters, etc. One detailed example of a rule-based expert system that can be used in the present invention is described in U.S. Patent Application Publication No. 2008/0154832 ("Method for Message Suppression in Rule Based Expert System," by Kral et al.), which is incorporated by reference herein.

In the present invention, the rule-based expert system includes rules that are configured to identify abnormal operating conditions in the industrial plant. If an abnormal operating condition is identified, the action to be taken may be to notify plant personnel about the abnormal situation. Notification to the plant personnel may be sent via an operator interface (such as a console screen), email, pager, text message to a portable communication device, or any other suitable communication mode. The actions to be taken may also be associated with correcting the abnormal situation and/or mitigating its effects. For example, based on a rule condition being satisfied, the rule-based expert system may notify plant personnel to overwrite a control signal value, overwrite a set point value, modify an equipment setting, shut down equipment, etc.

In certain embodiments of the present invention, the rule-based expert system also applies its rules to one or more of the results computed by the model-based expert system. For example, the rules may evaluate whether a statistical result generated by the model-based expert system violates a certain threshold value, and the action to be taken if so. In addition to the results computed by the model-based expert system, in some cases, the rules may also consider other information contained in the model-based expert system, such as outputs or decision variables of the mathematical model. In some cases, the rule-based expert system may also have rules for determining which of the statistical results generated by the model-based expert system to evaluate. In some cases, the rule-based expert system may also have rules for determining how the statistical results of the model-based expert system are to be evaluated together with other process data and/or conditions in order to identify abnormal events.

An underlying abnormality in the plant operations may generate a large number of alert messages, many of which may be superfluous or redundant. An overload of alert messages can reduce the effectiveness of the abnormal event identification system. This problem of message overload can be compounded when using both a model-based expert system together with a rule-based expert system for diagnosis.

In order to better coordinate messages to the plant operator, in some embodiments of the present invention, the rule-based expert system further contains rules for determining whether any messages from the model-based expert system are made redundant to a conclusion made by the rule-based expert system. In such cases, the rule-based expert system may act to suppress those redundant messages from the model-based expert system. For example, if an underlying problem results in a large number of alert messages being generated for related equipment, measurements, parameters, etc., the rule-based expert system can screen these alert messages so that they do not obscure the underlying problem and present the most relevant messages to the operator.

Furthermore, where the model-based expert system has multiple different mathematical models to handle different operating modes of the process unit, there may be a need to suppress one or more of the mathematical models based on the current operating mode of the process unit. Furthermore, these different mathematical models may be activated or inactivated based on the process operating mode.

FIG. 1 shows a schematic diagram of how the present invention can be implemented according to one particular embodiment. The present invention may be suitable for use with a variety of different types of process units within an industrial plant, such as those in the petroleum or petrochemical industry. In this particular case, the abnormal event identification system is designed for use with a distillation tower in a refinery.

The distillation tower is associated with various sensors 10 that sense the operating conditions (e.g., temperature, flow, concentrations, etc.). The sensors 10 are in communication with a process control system 16, which receives data from the sensors 10. The process control system 16 may also receive data from on-line analyzers or laboratory analysis.

The process control system 16 operates together with an abnormal event identification system for identifying abnormal events in the distillation tower. The abnormal event identification system includes a model-based expert system 20 and a rule-based expert system 24. Data from the process control system 16 are fed into the model-based expert system 20, which then calculates one or more statistical indices 22 that determine whether the distillation tower is operating abnormally.

The system also includes a relational database 40 that is accessed by both the model-based expert system 20 and the rule-based expert system 24. Database 40 contains: (a) data pertaining to the configuration of the mathematical model in the model-based expert system; (b) data pertaining to the configuration of the rules in the rule-based expert system; and (c) data pertaining to the message suppression relationships in the integrated expert system. Database 40 may also contain information that is relevant to determining a source of an identified abnormality and/or steps to either further analyze the problem or correct the problem. The database may also store historical data, such as past alarms and alerts, past abnormal events, operator response/feedback to these alarms and alerts, and editing history of rules and models. When a problem is identified, the rule-based expert system may apply the rules for analysis to the relevant data in the database. Repeating source(s) of abnormal events can also be analyzed from the database to identify repeating problems.

The rule-based expert system 24 is configured according to the configuration data contained in database 40. In operation, the rule-based expert system 24 evaluates the rules as applied to data received from the process control system 16. Furthermore, the rule-based expert system 24 evaluates the rules as applied to the results calculated by the model-based expert system 20. Based on these evaluations, the rule-based expert system 24 can make conclusions about whether the distillation tower is operating normally and identify specific abnormal situations.

Both the model-based expert system 20 and the rule-based expert system 24 generate alert messages 30 and 34, respectively, relating to the identification of an abnormal event. Message coordination module 36 coordinates and manages the messages received from the various sources. Message coordination module 36 will also suppress any messages 30 from the model-based expert system 20 that are redundant to messages 34 sent by the rule-based expert system 24. The messages are sent to an operator console 38 that displays alert messages and abnormality monitors that monitor various operational areas of the industrial plant. Thus, the operator console 38 can give the operator a quick overview of the distillation tower's operations and indicate the probability of any developing abnormalities. Having been alerted to the potential abnormal events, the operator can then take steps to adjust the operation of the distillation tower (e.g., adjust valves, set points, or other control mechanisms). One detailed example of an operator interface that is suitable for use in the present invention is described in U.S. Patent Application Publication No. 2008/0097637 (titled "Application of Abnormal Event Detection (AED) Technology to Polymers Process," by Anh Nguyen et al.), which is incorporated by reference in its entirety. The integrated system may also include a web-based reporting function for generating system performance metrics, edit history, alert history, operator responses/feedback, and troubleshooting information.

FIG. 2 shows an example of the inputs used for a PCA model (named "T-814") for a distillation tower. Based on these inputs, the T-814 model will calculate the values of various model variables that represent the normal operation of the distillation tower. The calculated values are compared against the actual values of the process conditions represented by the model variables. Actual process values that deviate from the model-calculated values may indicate that the distillation tower is operating abnormally. Statistical indices that measure the amount of deviation are then fed into the rule-based expert system to further evaluate the possible abnormal event.

FIGS. 3A and 3B show an example of how the rule-based expert system can identify an abnormal event in a distillation tower unit. This particular example relates to the identification of a flooding event in a distillation tower. FIG. 3A shows a set of rules for evaluating a condition on a process variable and a statistical result from the model-based expert system. The function "PCA-RESIDUAL" in the second rule condition (C2) is used to evaluate the statistical result from the Principle Component Analysis model T-814. Here, a set of two rule conditions (C1, C2) are combined to identify a flooding event in the distillation tower. In this set of rules, if both of conditions C1 and C2 are true, then the rule-based expert system determines that a flooding event has occurred.

FIG. 3B shows a series of advisory mitigation steps relating to this abnormal event that will be presented to the operator. Optionally, the message may include any associated documentation, such as operating procedures, that will assist the operator in mitigating the abnormal situation. The rule-based expert system will also suppress any redundant messages from the model-based expert system relating to the identification of the tower flooding event.

Figure 4:
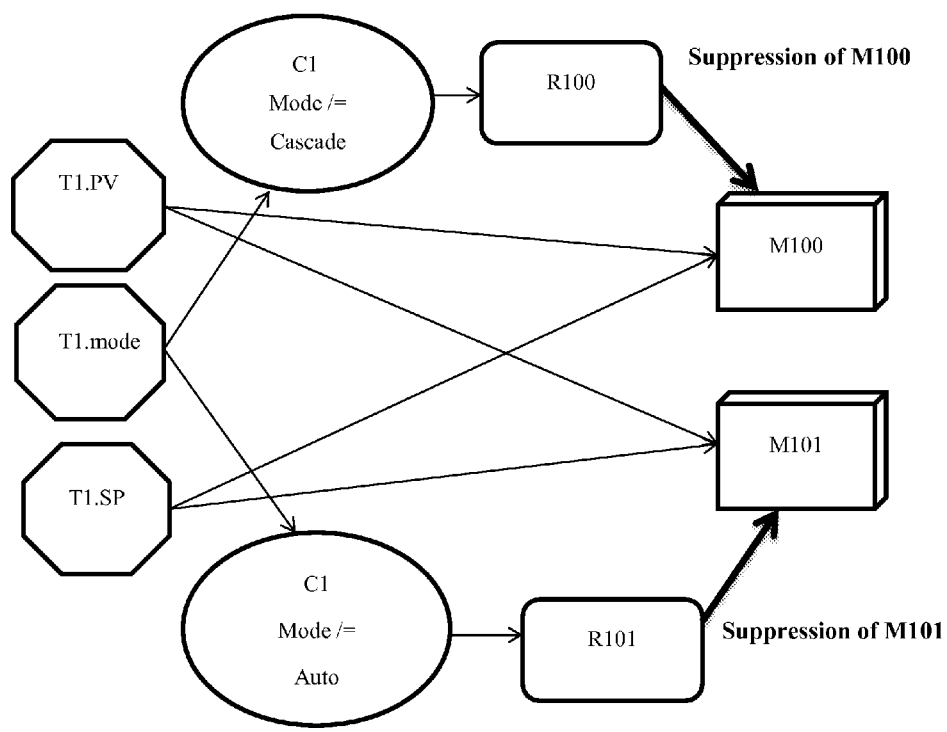
FIG. 4 shows a schematic diagram of another embodiment of the present invention in which models are suppressed based on the operating mode of the process unit.

FIG. 4 shows a schematic diagram of another embodiment of the present invention. The system of FIG. 4 uses a model-based expert system having two different PCA models, M100 and M101. Model M100 is adapted for use when the process unit is operating in the cascade control mode; model M101 is adapted for use when the process unit is operating in the auto-control mode. "T1.PV" is a tag containing data for the process variables; "T1.mode" is a tag containing information about the operating mode of a controller; and "T1.SP" is a tag containing the set point value for a controller. Models M100 and M101 receive data for the process variables and set point values as input via tags "T1.PV" and "T1.SP". The rule-based expert system includes a rule R100 having a condition "mode is not equal to cascade." If this condition is true, then rule R100 causes an action that suppresses alert messages generated by model M100. The rule-based expert system also includes a rule R101 having a condition "mode is not equal to auto." If this condition is true, then rule R101 causes an action that suppresses alert messages generated by model M101. Conditions that can cause message suppression of certain models can also include other types of operating modes of the process unit such as different grades of product, significant process transitions (e.g., startups, shutdowns, feedstock switches), processing of different feedstock (e.g., cracking naphtha rather than ethane in olefins production), different configurations of the process equipment (e.g., different sets of equipment running), different time period (e.g., summer vs. winter), or different product rates (e.g., high throughput vs. low throughput).

In certain embodiments, the rules in the rule-based expert system are evaluated in a sequence for improved or optimized operation of the expert system. In one embodiment, the rules are evaluated in a sequence such that rules whose conditional premises are fully known are evaluated before the rules whose conditional premises are not fully known. In particular, the rules whose conditional premises rely on the conclusions of other rules are evaluated after those other rules are evaluated. In other words, in the case where there is a second rule (or second set of rules) whose condition relies on a conclusion of a first rule (or first set of rules), then the second rule (or second set of rules) will be evaluated after the conclusion of the first rule (or first set of rules) is established. To evaluate the rules in the proper sequence, the expert system may use a rule evaluation schedule that lists the order in which the rules are to be evaluated. The expert system may update the schedule when a new rule is added or when an existing rule is modified (for example, there may be a new conditional premise in a modified rule that requires an update to the evaluation schedule). The schedules may be established at the beginning of the operation of the expert system.

Figure 5:
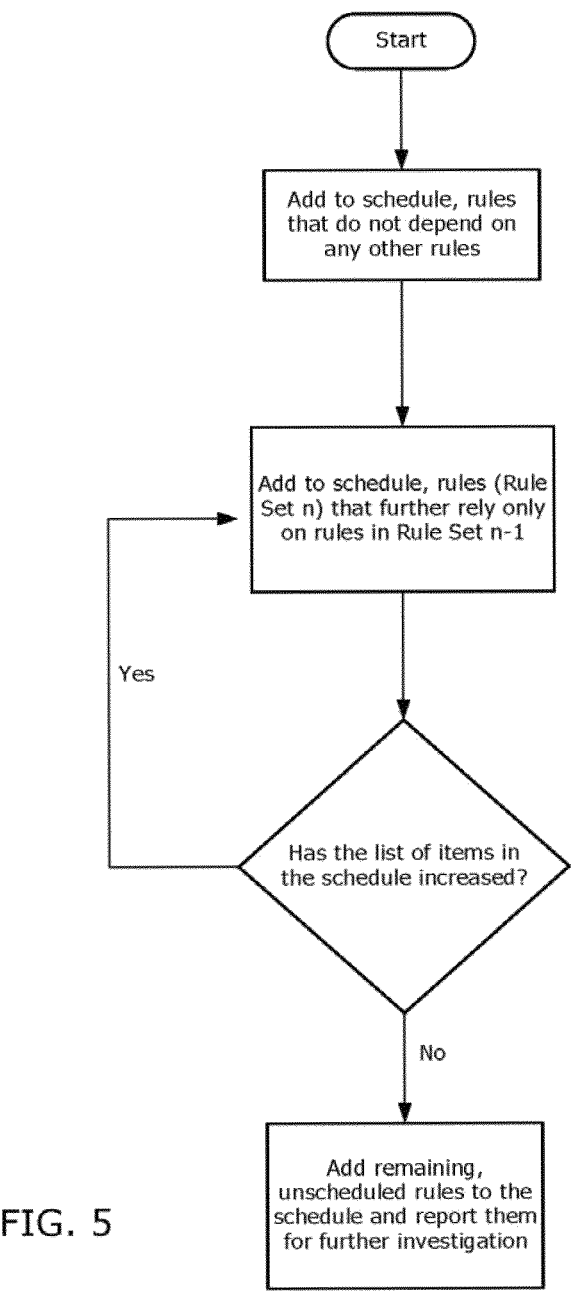
FIG. 5 shows an example algorithm for making a rule evaluation schedule.

The present invention may use any suitable algorithm for making the rule evaluation schedule. An example algorithm for making a rule evaluation schedule is shown in the flowchart of FIG. 5. Initially, rules that do not rely on any other rules (e.g. relying only on data value assignments for attributes or model parameters) are added to the beginning of the schedule. To facilitate explanation, this set of rules can be called Rule Set 1. Next, the rules that further rely only on Rule Set 1 are added as next items in the schedule. Again, to facilitate explanation, this set of rules can be called Rule Set 2. Next, the rules that further rely only on Rule Set 2 are added as next items in the schedule (i.e. Rule Set 3). This process can be repeated through further iterations until all the rules have been scheduled or until the list of items in the schedule stops increasing. If there are any unscheduled rules at the end of this iterative process, those rules can be added to the end of the schedule and reported for further investigation.

The result of this process is a schedule of rules which avoids redundant or circular evaluation of rules. This feature may be useful for conflict resolution of rules and may result in various benefits, including elimination of faulty evaluation and miss-triggering of operator messages, detection of circular references, and separation of rule evaluation from the operator message suppression functionality to streamline and eliminate redundant evaluations.

Certain embodiments of the present invention may be implemented on any suitable computer system. The computer system may include addressable memory (e.g., random access memory or cache memory) to store data and/or sets of instructions that may be included within, or be generated by, the executable instructions when they are executed by a processor on the respective platform; as well as a processor for performing the calculations that are needed. The computer system may consist of one computer or include multiple computers that are networked together to perform the various functionalities and capabilities described above. For example, multiple servers can be networked for use as production and development systems with on-demand database synchronization capabilities for easy promotion of developed models and rules from the development server to the production server. Certain embodiments of the present invention also encompass an industrial plant that uses such a computer system. Certain embodiments of the present invention may also be provided as software in the form of a computer-readable storage medium, such as hard drive memory, flash memory, or optically-encoded memory (e.g., a compact disk, DVD-ROM, DVD±R, CD-ROM, CD±R).

Although the various systems, modules, functions, or components of the present invention may be described separately, in implementation, they do not necessarily exist as separate elements. The various functions and capabilities disclosed herein may be performed by separate units or be combined into a single unit. Further, the division of work between the functional units can vary. Furthermore, the functional distinctions that are described herein may be integrated in various ways. For example, in the system of FIG. 1, a separate message coordination module 36 is shown to perform the work involved in suppressing messages. However, it is also possible that this message suppression function may be integrated into the rule-based expert system 24 instead. Thus, while the block diagram of FIG. 1 makes functional distinctions for the sake of clarity and understanding, there may not be meaningful distinctions in an implementation of the present invention.

The foregoing description and examples have been set forth merely to illustrate the invention and are not intended to be limiting. Each of the disclosed aspects and embodiments of the present invention may be considered individually or in combination with other aspects, embodiments, and variations of the invention. Modifications of the disclosed embodiments incorporating the spirit and substance of the invention may occur to persons skilled in the art and such modifications are within the scope of the present invention.

What is claimed is:

1. A method for operating an industrial plant, comprising:
having a rule-based expert system that comprises a set of rules for evaluating the operation of a process unit in the industrial plant;
having a model-based expert system that comprises a statistical mathematical model for evaluating the operation of the process unit in the industrial plant;
applying the model-based expert system to evaluate the operation of the process unit using statistical data on the operating conditions of the process unit;
obtaining a statistical analysis result from the model-based expert system;
applying the rule-based expert system to identify a possible abnormality in the operation of the process unit using: (a) data on the operating conditions of the process unit, and (b) the result from the model-based expert system;
sending a first message from the rule-based expert system regarding an abnormality to an operator interface;
suppressing a second message from the model-based expert system, wherein the suppressed message relates to the abnormality and is redundant to the first message; and
adjusting the operation of the process unit based on the message relating to the abnormality.

2. The method of claim 1, wherein the mathematical model in the model-based expert system includes a principal component analysis model.

3. The method of claim 2, wherein the mathematical model further includes a valve flow model, a proportional-integral-derivative control monitor model, and a partial least squares (PLS) model.

4. The method of claim 1, further comprising using a database accessible by both the model-based expert system and the rule-based expert system, wherein the database comprises:
(a) data pertaining to the configuration of the mathematical model in the model-based expert system; and
(b) data pertaining to the configuration of the rules in the rule-based expert system.

5. The method of claim 4, wherein the database further comprises: (c) data pertaining to the message suppression relationships in the integrated expert system.

6. The method of claim 1, wherein the result from the model-based expert system is a statistical analysis result on the operation of the process unit, and wherein the rule-based expert system evaluates the statistical analysis result calculated by the model-based expert system.

7. The method of claim 1, wherein the model-based expert system comprises multiple different mathematical models for the same process unit in the industrial plant;
   wherein the model-based expert system calculates one or more results from the different mathematical models;
   wherein the rule-based expert system further uses: (c) information relating to the operating mode of the process unit; and
   wherein the message selected for suppression is at least partly determined on the basis of the operating mode of the process unit.

8. The method of claim 1, wherein the step of applying the rule-based expert system comprises evaluating the set of rules in a sequence such that rules whose conditional premises are fully known are evaluated before the rules whose conditional premises are not fully known.

9. The method of claim 8, wherein the set of rules includes a first rule and a second rule that relies on a conclusion of the first rule, and wherein the first rule is evaluated before the second rule.

10. The method of claim 1, wherein the step of applying the rule-based expert system comprises evaluating the set of rules according to a rule evaluation schedule, and wherein the method further comprises the step of making a rule evaluation schedule, which comprises the steps of:
    adding to the rule evaluation schedule, a first set of rules whose conditions do not depend on other rules; and
    adding to the rule evaluation schedule, a second set of rules that are not already in the schedule whose conditions include dependencies on rules in the first set of rules but do not depend on any other rules.

11. The method of claim 10, wherein the step of making a rule evaluation schedule further comprises the step of adding to the rule evaluation schedule, a third set of rules not already in the schedule whose conditions include dependencies on rules in the first set of rules or the second set of rules, but do not depend on any other rules.

12. An industrial plant, comprising:
    a process unit;
    multiple sensors that sense the operating condition of the process unit;
    a process control system in communication with the multiple sensors;
    an operator interface; and
    a computer system that comprises:
      a) a rule-based expert system that comprises a set of rules for evaluating the operation of the process unit;
      b) a model-based expert system that comprises a statistical mathematical model for evaluating the operation of the process unit;
    wherein the computer system is programmed to perform steps comprising:
      receiving data on the operating conditions of the process unit;
      applying the model-based expert system to evaluate the operation of the process unit using data on the operating conditions of the process unit;
      obtaining a statistical analysis result from the model-based expert system;
      applying the rule-based expert system to identify a possible abnormality in the operation of the process unit using: (a) data on the operating conditions of the process unit, and (b) the statistical analysis result from the model-based expert system;
      sending a first message from the rule-based expert system regarding an abnormality to the operator interface; and
      suppressing a second message from the model-based expert system, wherein the suppressed message relates to the abnormality and is redundant to the first message.

13. The industrial plant of claim 12, wherein the mathematical model in the model-based expert system includes a principal component analysis model.

14. The industrial plant of claim 13, wherein the mathematical model further includes a valve flow model, a proportional-integral-derivative control monitor model, and a partial least squares (PLS) model.

15. The industrial plant of claim 12, further comprising using a database accessible by both the model-based expert system and the rule-based expert system, wherein the database comprises:
    (a) data pertaining to the configuration of the mathematical model in the model-based expert system; and
    (b) data pertaining to the configuration of the rules in the rule-based expert system.

16. The industrial plant of claim 15, wherein the database further comprises: [c] data pertaining to the message suppression relationships in the integrated expert system.

17. The industrial plant of claim 12, wherein the result from the model-based expert system is a statistical analysis result on the operation of the process unit, and wherein the rule-based expert system evaluates the statistical analysis result calculated by the model-based expert system.

18. The industrial plant of claim 12, wherein the model-based expert system comprises multiple different mathematical models for the same process unit in the industrial plant;
    wherein the model-based expert system calculates one or more results from the different mathematical models;
    wherein the rule-based expert system further uses: (c) information relating to the operating mode of the process unit; and
    wherein the message selected for suppression is at least partly determined on the basis of the operating mode of the process unit.

19. A computer system comprising:
    a) a rule-based expert system that comprises a set of rules for evaluating the operation of a process unit in an industrial plant;
    b) a model-based expert system that comprises a statistical mathematical model for evaluating the operation of the process unit;
    wherein the computer system is programmed to perform steps comprising:
      receiving data on the operating conditions of the process unit;
      applying the model-based expert system to evaluate the operation of the process unit using data on the operating conditions of the process unit;
      obtaining a statistical analysis result from the model-based expert system;
      applying the rule-based expert system to identify a possible abnormality in the operation of the process unit using: (a) data on the operating conditions of the process unit, and (b) the result from the model-based expert system;
      sending a first message from the rule-based expert system regarding an abnormality to an operator interface; and suppressing a second message from the model-based expert system, wherein the suppressed message relates to the abnormality and is redundant to the first message.

20. The computer system of claim 19, wherein the mathematical model in the model-based expert system includes a principal component analysis model.

21. The computer system of claim 20, wherein the mathematical model further includes a valve flow model, a proportional-integral-derivative control monitor model, and a partial least squares (PLS) model.

22. The computer system of claim 19, further comprising using a database accessible by both the model-based expert system and the rule-based expert system, wherein the database comprises:
   (a) data pertaining to the configuration of the mathematical model in the model-based expert system; and
   (b) data pertaining to the configuration of the rules in the rule-based expert system.

23. The computer system of claim 22, wherein the database further comprises: (c) data pertaining to the message suppression relationships in the integrated expert system.

24. The computer system of claim 19, wherein the result from the model-based expert system is a statistical analysis result on the operation of the process unit, and wherein the rule-based expert system evaluates the statistical analysis result calculated by the model-based expert system.

25. The computer system of claim 19, wherein the model-based expert system comprises multiple different mathematical models for the same process unit in the industrial plant;
   wherein the model-based expert system calculates one or more results from the different mathematical models;
   wherein the rule-based expert system further uses: (c) information relating to the operating mode of the process unit; and
   wherein the message selected for suppression is at least partly determined on the basis of the operating mode of the process unit.

* * * * *